United States Patent [19]

Tognazzini

[11] Patent Number: 6,078,310
[45] Date of Patent: Jun. 20, 2000

[54] EYETRACKED ALERT MESSAGES

[75] Inventor: Bruce Tognazzini, Woodside, Calif.

[73] Assignee: Sun Microsystems, Inc., Palo Alto, Calif.

[21] Appl. No.: 08/670,930

[22] Filed: Jun. 26, 1996

[51] Int. Cl.[7] .................................................. G09G 5/00
[52] U.S. Cl. .............................. 345/158; 345/8; 345/127
[58] Field of Search ..................................... 345/157, 158, 345/7, 8, 127; 341/20–23; 250/201.4; 348/115, 169–172

[56]  References Cited

U.S. PATENT DOCUMENTS

| | | | |
|---|---|---|---|
| 4,109,145 | 8/1978 | Graf | 250/201 |
| 5,223,828 | 6/1993 | McKiel, Jr. | 340/825.19 |
| 5,247,433 | 9/1993 | Kitaura et al. | 364/188 |
| 5,360,971 | 11/1994 | Kaufman et al. | 340/825.19 |
| 5,367,315 | 11/1994 | Pan | 345/156 |
| 5,579,048 | 11/1996 | Hirasawa | 348/333 |
| 5,635,948 | 6/1997 | Tonosaki | 345/8 |
| 5,649,061 | 7/1997 | Smyth | 395/20 |
| 5,731,805 | 3/1998 | Tognazzini et al. | 345/156 |
| 5,898,423 | 4/1999 | Tognazzini et al. | 345/158 |

FOREIGN PATENT DOCUMENTS 7-48308  2/1995  Japan .

OTHER PUBLICATIONS

Arne John Glenstrup, Theo engelll–Nielsen, Eye Controlled Media: Present and Future State, Jun. 1, 1995, pp. 1–45.
Fourward Eyetracker, SRI Homepage at http:/www.sri.com. Apr. 30, 1996.
Jacob Nielsen, Noncommand User Interface, Communications of the ACM, Apr. 1993/vol. 36.No. 4, pp. 83–89.
Dixon Cleveland and Nancy Cleveland, Eyegaze Eyetracking System, Jan. 29–31, 1992.
Patent Abstracts of Japan, vol. 096, No. 002, Feb. 29, 1996 and JP 07 257228, Nissan Motor Co. Ltd., Oct. 9, 1995.

*Primary Examiner*—Daniel J. Wu
*Attorney, Agent, or Firm*—McDermott, Will & Emery

[57]  ABSTRACT

User messages are automatically positioned on a display at a location at which a user's gaze is directed as indicated by an eyetracker. When a user has read the message, as indicated by his eyes having traversed the text, the message is automatically cleared. The message may also be cleared by a user's spoken response.

16 Claims, 5 Drawing Sheets

EYETRACKED ALERT MESSAGES

BACKGROUND OF THE INVENTION

1. Field of the Invention

Invention relates to computer systems, and more particularly, to computer systems which display system messages or error messages to an user.

2. Description of Related Art

Computer systems are known which open a window to display a system message or an error message to an user. Since these messages are important and since prior art systems have no way of determining when a user has read an error message, the opening of a message window stops the processing of the program underway until such time as the user acknowledges having read the error message by taking some action, such as pressing "Return".

It is also known in the art to sound an alarm, such as a beep, to inform the user that an error has occurred. Such systems have the problem that a user may make a number of errors in the process of learning new software or of operating the computer so that, when others are nearby, the presence of a beep is embarrassing.

Eyetracking devices are known particularly in conjunction with heads up displays in certain control applications in aircraft. An eyetracker device monitors the eyes of a user and calculates the direction in which the user is looking and, in some applications, the particular point in three dimensional space on which the user's eyes focus.

One commercial eyetracker is the Dual-Purkinje-Image (DPI) Eyetracker, manufactured by Forward Optical Technologies, Inc. of El Chaon, Calif. It determines the direction of gaze over a large two dimensional visual field with great accuracy and without any attachments to the eye. It operates with infra-red light which is invisible to the subject and does not interfere with normal vision. The eyetracker has a pointing accuracy on the order of one minute of arc and response time on the order of one millisecond. One can utilize the DPI Eyetracker with an infra-red optometer to allow a continuous measure of eye focus, producing a three dimensional eyetracker.

Object oriented programming is a known form of software development that models the real world representation of objects or modules that contain data as well as instructions that work upon that data. Objects are the basic building blocks of an object oriented program. Objects are software entities. They may model something physical like a person or they may model something virtual like checking account. Normally an object has one or more attributes (fields) that collectively define the state of the object; behavior defined by a set of methods (procedures) that can modify those attributes; and an identity that distinguishes it from other objects. Encapsulation refers to the hiding of most of the details of the object. This permits the object to be treated as a single entity. However, the set of operations associated with the object are explicit and constitute a well defined interface. One object requests another object to perform one or more operations through messaging. An object is sometimes referred to as an instance of an abstract data type or class. The programmer may define a class of objects by describing the attributes and procedures common to the class. By defining the class only once, a plurality of instances can be created by associating the class attributes and procedures with each instance and allowing the instances to differ only in their identity or in a particular value associated with the range of values permitted for the class.

Object oriented programming also permits creation of subclasses in which class attributes and procedures can be inherited from the class by subordinate subclasses and creation of super classes in which only the common attributes and procedures of a group of instances of various classes are retained as the defining characteristics.

SUMMARY OF THE INVENTION

The present invention provides apparatus, systems, processes and computer program products which permit the user to remove messages without any complicated hand eye interaction. This is accomplished by integrating an eyetracker with the computer in such a way that when a message is to be displayed, the message is positioned on the screen at a location to which the user's attention is already directed as indicated by the eyetracker. The beginning of the text of the message is also displayed as closely to the point at which the user's gaze is directed as possible. The system then monitors the user's eyes to determine whether the user has read the message. If the course of the user's gaze indicates that his eyes have traversed the message, then the message may be removed from the screen and processing continue where it was before the message object was placed on the screen.

In an alternative approach, the message object can be cleared by using a microphone pickup together with an audio input interface to detect when the user speaks the word "OK" or the like.

The invention relates to apparatus for managing message information on a display, including a computer, at least one display connected to the computer, an eyetracker connected to the computer for detecting a location on the display at which a user's eyes are looking, and a controller for displaying a message for a user at the location, when the location is on the at least one display. The controller places the start of text of the message as closely as possible to the location. The controller also sounds an alarm to call a user's attention back to the display when the location at which the user is looking is not on the display. The controller clears the message when the eyetracker indicates that the user's eyes have scanned the message. If a plurality of displays are used, the controller displays a message for a user on a one of the plurality of displays at which the user is looking and at the location on that display. An audio microphone can be connected to the computer for providing representations of speech to the computer, and the computer is configured to recognize a verbal command to clear a message.

The invention is also directed to a method of displaying a message for a user using a computer having an eyetracker, by determining a location where a user is looking, and displaying the message at the location if the location is on a display. The start of text of the message is displayed as close as possible to that location.

The invention is also directed to a method of displaying a message for a user using a computer having an eyetracker and a plurality of displays, by determining a location where a user is looking, and displaying the message on one of the displays at that location if the location is on a display.

The invention is also directed to a computer system, including a network, and a plurality of computers connected to the network, at least one of the computers having an eyetracker and configured for detecting a location on a display at which a user's eyes are looking and for displaying a message at the location if the location is on a display.

The invention is also directed to computer program products for carrying out the techniques of the invention.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1A:
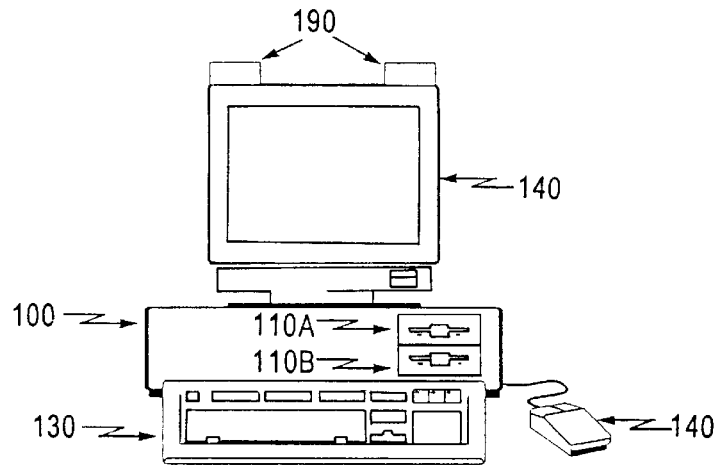
FIG. 1A illustrates a computer, equipped with an eyetracker, of a type suitable for carrying out the invention.

FIG. 1A illustrates a computer of a type suitable for carrying out the invention. Viewed externally in FIG. 1A, a computer system has a central processing unit 100 having disk drives 110A and 110B. Disk drive indications 110A and 110B are merely symbolic of a number of disk drives which might be accommodated by the computer system. Typically, these would include a floppy disk drive such as 110A, a hard disk drive (not shown externally) and a CD ROM drive indicated by slot 110B. The number and type of drives varies, typically, with different computer configurations. The computer has the display 120 upon which information is displayed. A keyboard 130 and a mouse 140 are typically also available as input devices over interface 145. One or more camera and illumination parts 190, shown mounted on the display casing, are used to observe the user's eyes and determine the position at which a user's eyes are looking. Preferably, the computer illustrated in FIG. 1A is a SPARC workstation from Sun Microsystems, Inc.

Figure 1B:
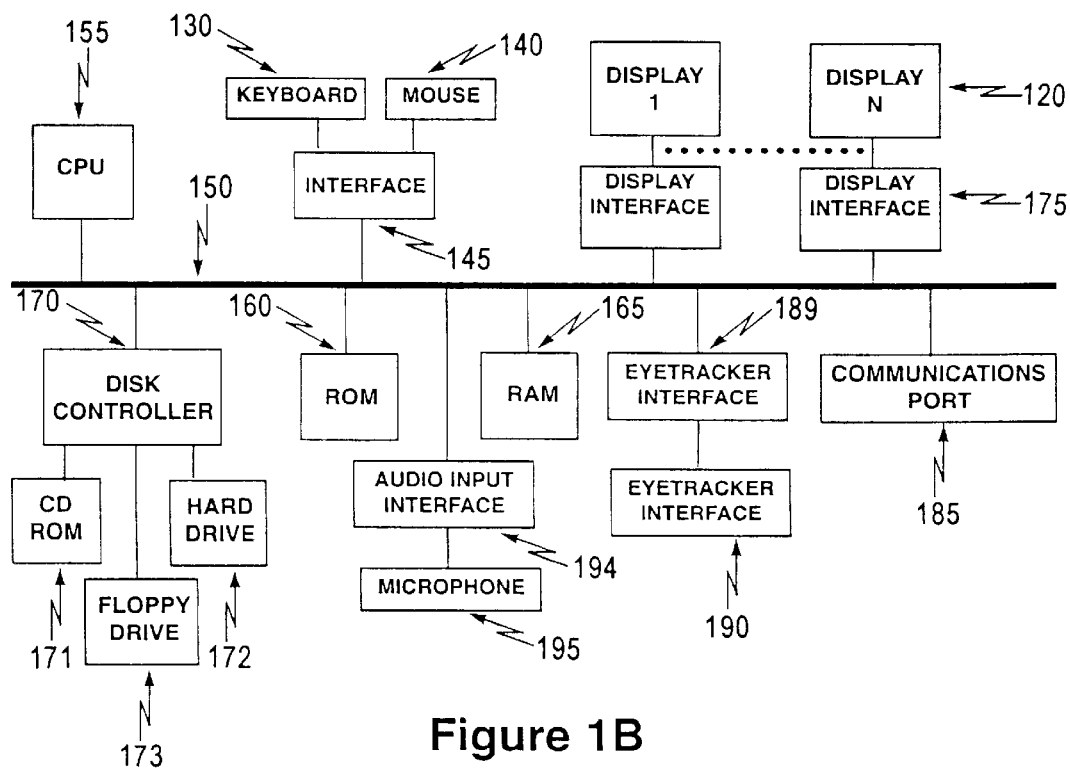
FIG. 1B illustrates a block diagram of the computer of FIG. 1A.

FIG. 1B illustrates a block diagram of the internal hardware of the computer of FIG. 1A. A bus 150 serves as the main information highway interconnecting the other components of the computer. CPU 155 is the central processing unit of the system, performing calculations and logic operations required to execute a program. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disks) drives such as 171. A display interface 175 interfaces a high resolution display 120 and permits information from the bus to be displayed on the display. An eyetracker 190 is connected to the bus on eyetracker interface 189. It locates the position at which a user's eyes are looking. Many of the control functions described herein are activated based upon where a user is looking. Communications with external devices can occur over communications port 185.

Figure 1C:
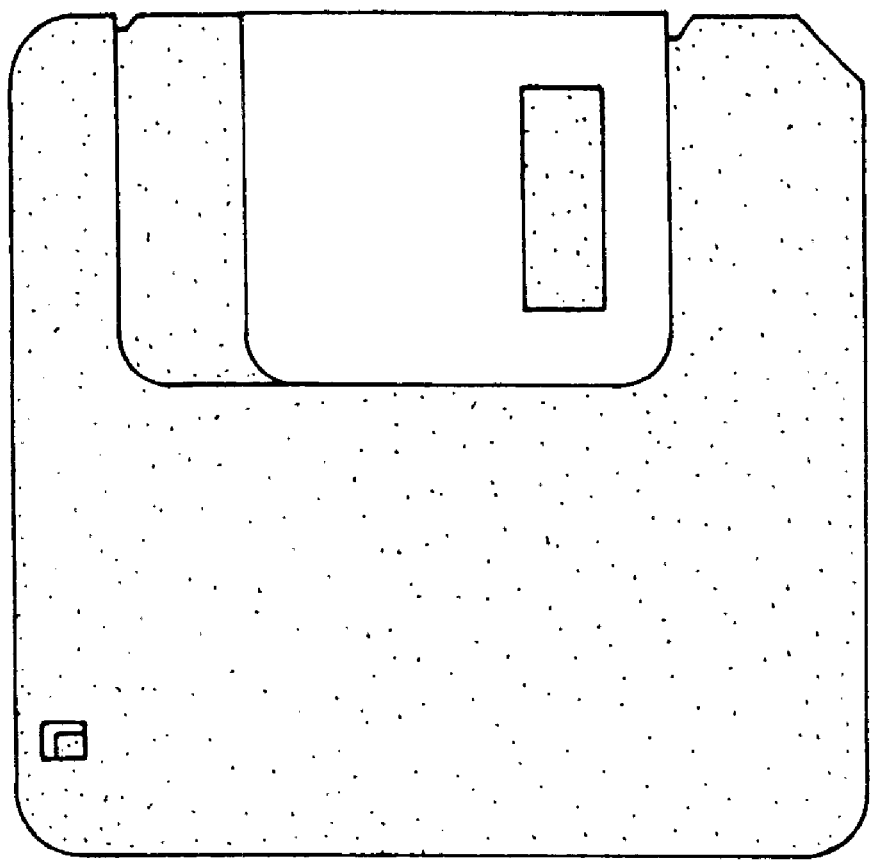
FIG. 1C illustrates an exemplary memory medium containing a program usable with the computer of FIG. 1A.

FIG. 1C illustrates an exemplary memory medium which can be used with drives such as 173 in FIG. 1B or 110A in FIG. 1A. Typically, memory media such as a floppy disk, a CD ROM, or a Digital Video Disk will contain the program information for controlling the computer to enable the computer to perform its testing and development functions in accordance with the invention.

Figure 2:
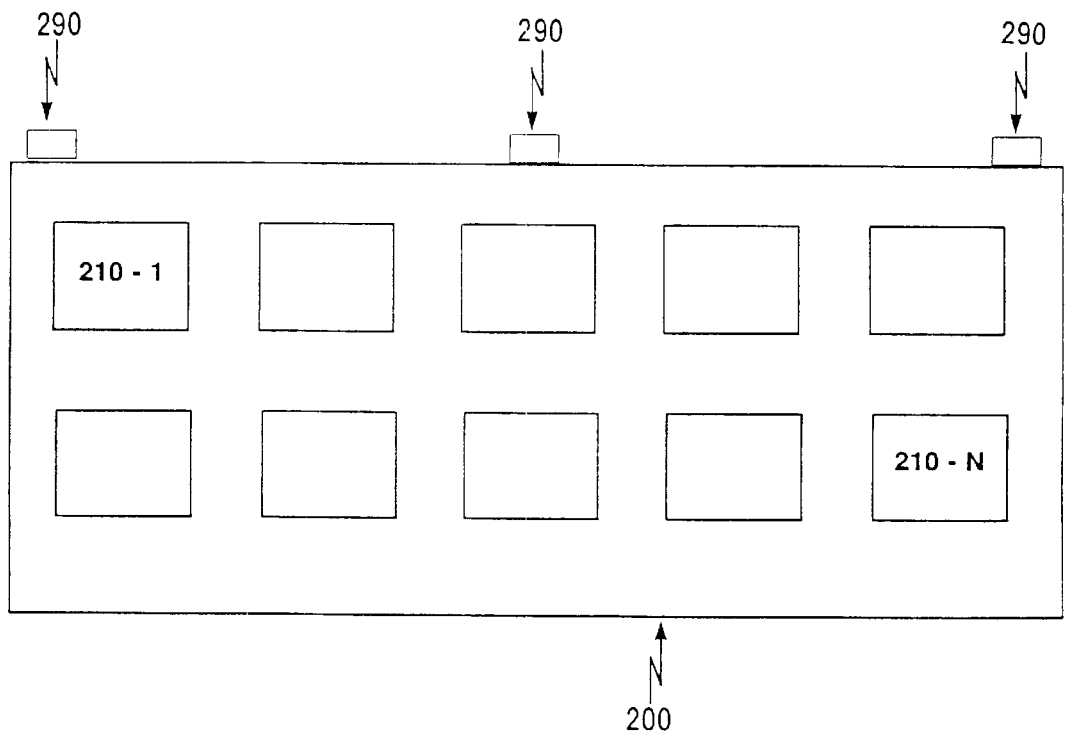
FIG. 2 is a front view of a multi-display computer console.

FIG. 2 is a front view of a multi-display computer console. The console of FIG. 2 shows N display monitors 210-1 through 210-n. They are set in a regular array within the console housing. Shown on top of the console, are eyetracker sensors 290 positioned so as to provide complete coverage over the entire surface of the monitor console. If a single eyetracker input device is not sufficient, then a plurality of eyetracker devices are utilized. These may be partitioned into zones in order to determine the location of an user's gaze with considerable accuracy. A multi-display console as shown in FIG. 2, would normally be used with a rather complex system.

Figure 3:
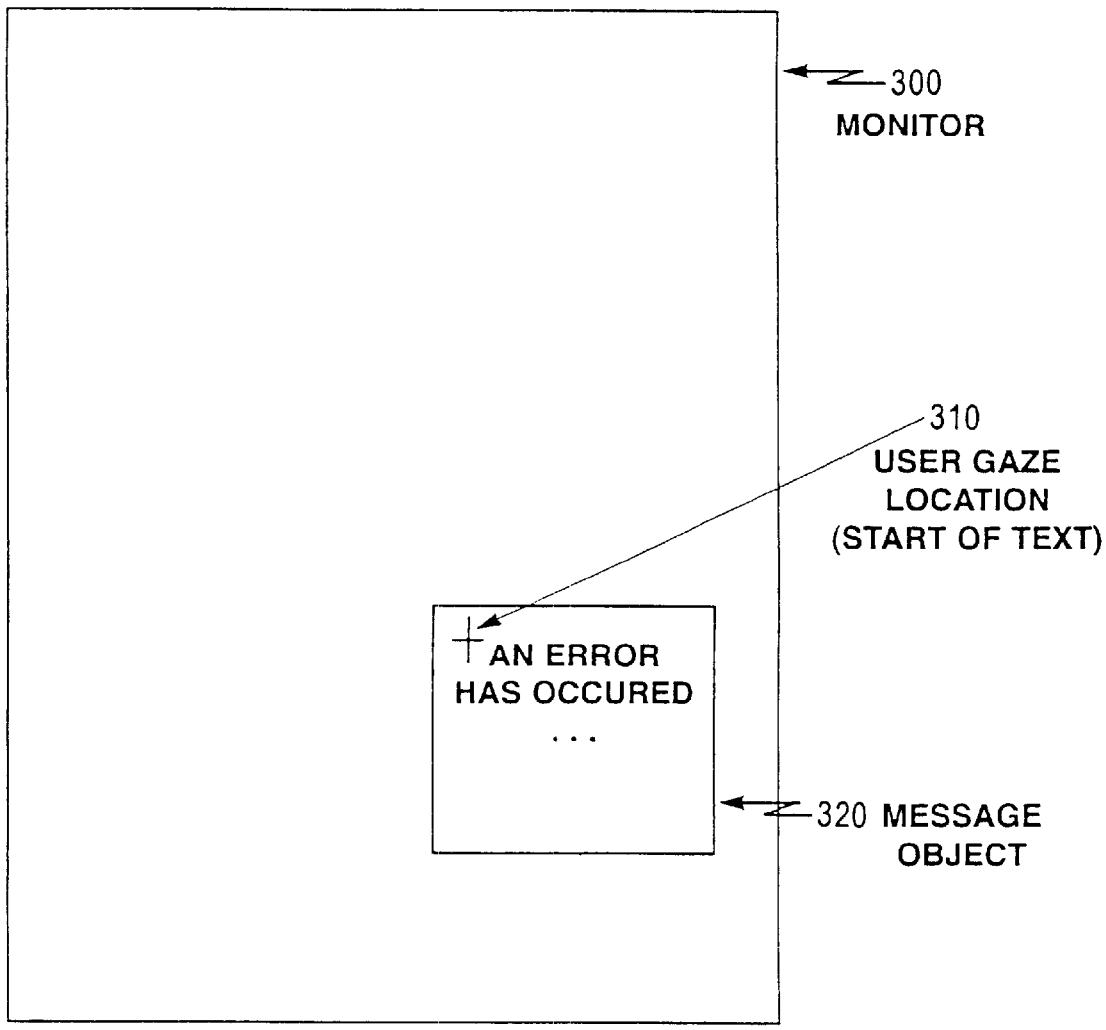
FIG. 3 illustrates opening of a message object at a user's location of gaze.

FIG. 3 illustrates opening of a message object at an user's location of gaze. The user's gaze is located on monitor 300 at a particular point in time when a message object 320 is invoked. As shown in FIG. 3, the start of text in the message object window begins as closely as possible to the location of the user's gaze, indicated by the crossbars in this illustration, so that the user's eyes are positioned to begin reading immediately upon opening of the message window.

Figure 4:
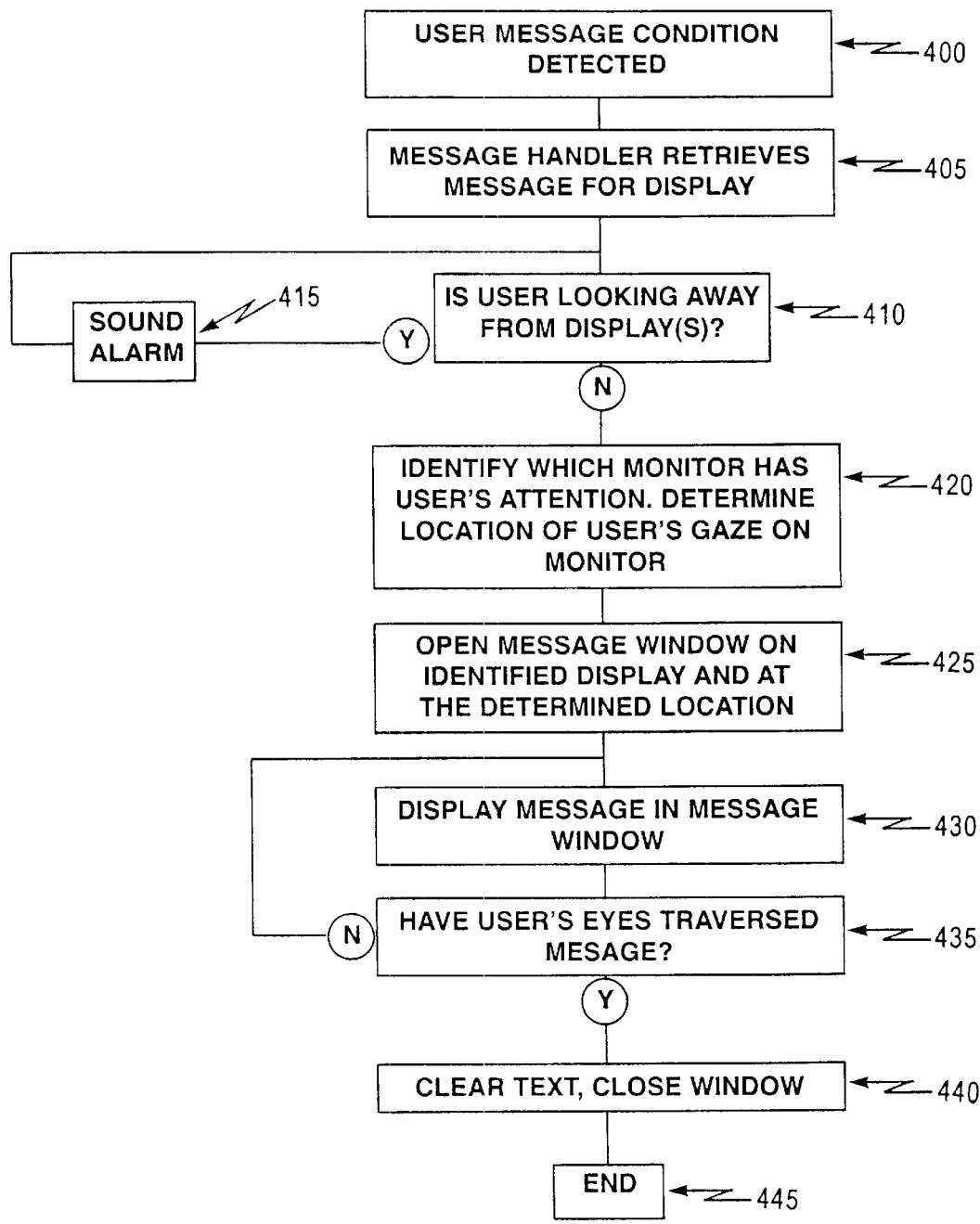
FIG. 4 is a flow chart of a process used for opening and closing message objects.

FIG. 4 is a flowchart of a process used for opening and clearing message objects. When a message condition or is detected (400), a message handler retrieves message text for display (405). The eyetracker determines if a user is looking away from the display (s). If the user is looking away, an audible alarm is sounded (415) to call the user's attention back to the display. If the user is looking at one of the displays (410), the identity of the display which has the user's attention is determined as well as the location of the user's gaze on that display (420). A message window is opened on the identified display at the location determined for the user's gaze (425). A message is displayed in the message window (430) and the system begins monitoring to determine if the user's eyes have traversed the message. If the user's eyes have not traversed the message (435-n) the process loops back to before block 430. If the user has viewed the text of the message, the text is cleared and the window for the message object is closed (440) and the process ends.

The top of the text of the message is positioned as closely as possible to the user's gaze location to permit the user's eyes to rest as closely as possible upon the starting word of the text when the window is opened.

Rather than monitoring to see if an user's eyes have traversed the message as a mechanism for clearing the message, it is possible to utilize a microphone 195, audio input interface 194 and voice recognition software to recognize that a user has spoken the word "OK" or the like, thus clearing the message upon user command.

Summarizing the operation, when a message is to be displayed, the location of the user's gaze is determined and a message window is opened at the location of the user's gaze so that the text displayed by the message object will be at the location at which the user is looking. Once the user has read the message, as indicated by the user's eyes traversing the message window, the message may be cleared and normal processing resumed. As an alternative, a voice command may clear the error message.

In this manner, the problems associated with prior art message handling have been overcome and the convenient and natural processing of error messages occurs in accordance with the invention.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. Apparatus for managing message information on a display, comprising:
   a. a computer;
   b. at least one display connected to said computer;
   c. an eyetracker connected to said computer for detecting a location on said display at which a user's eyes are looking; and
   d. a controller for displaying a message for a user at said location, when said location is on said at least one display.

2. Apparatus of claim 1, in which said controller places the start of text of said message as closely as possible to said location.

3. Apparatus of claim 1, in which said controller sounds an alarm to call a user's attention back to the display when said location is not on said display.

4. Apparatus of claim 1, in which said controller clears said message when said eyetracker indicates that the user's eyes have scanned said message.

5. Apparatus of claim 1 including a plurality of displays and said controller displays a message for a user on a one of said plurality of displays at which said user is looking and at said location on said one of said plurality of displays.

6. Apparatus of claim 1, further comprising:
   an audio microphone, connected to said computer, for providing representations of speech to said computer; and
   said computer configured to recognize a verbal command to clear a message.

7. A method of displaying a message for a user using a computer having an eyetracker, comprising the steps of:
   a. providing an element for performing the step of determining a location where a user is looking; and
   b. providing an element for performing the step of positioning said message at a location close to said location if said location is on a display.

8. The method of claim 7, further comprising the step of providing an element for performing the step of sounding an alarm if said location is not on a display.

9. The method of claim 7 in which the start of text of said message is displayed at said location.

10. The method of claim 7 further comprising providing an element for performing the step of removing said message if the eyes of said user have traversed said message.

11. A method of displaying a message for a user using a computer having an eyetracker and a plurality of displays, comprising the steps of:
   a. providing an element for performing the step of determining a location where a user is looking; and
   b. providing an element for performing the step of displaying said message on one of said displays at a location close to said location if said location is on a display.

12. A computer system, comprising:
   a. a network; and
   b. a plurality of computers connected to said network, at least one of said computers having an eyetracker and configured for detecting a location on a display at which a user's eyes are looking and for displaying a message at a location close to said location if said location is on a display.

13. A computer program product for displaying a user message on a display of a computer having an eyetracker, comprising:
   a. a memory medium; and
   b. a computer program stored on said memory medium, said computer program containing instructions for determining a location where a user is looking; and displaying said message at a location close to said location if said location is on a display.

14. The computer program product of claim 13 in which said computer program contains further instructions for sounding an alarm if said location is not on a display.

15. The computer program product of claim 13 in which said computer program contains further instructions for removing said message if the eyes of said user have traversed said message.

16. A computer program product for displaying a user message on one of a plurality of displays of a computer having an eyetracker, comprising:

a. a memory medium; and b. a computer program stored on said memory medium, said computer program containing instructions for determining a location where a user is looking; for displaying said message on one of said displays at a location close to said location if said location is on a display.

* * * * *